Nov. 21, 1950    B. D. DYER    2,531,117
TREE HOLDER
Filed May 5, 1947
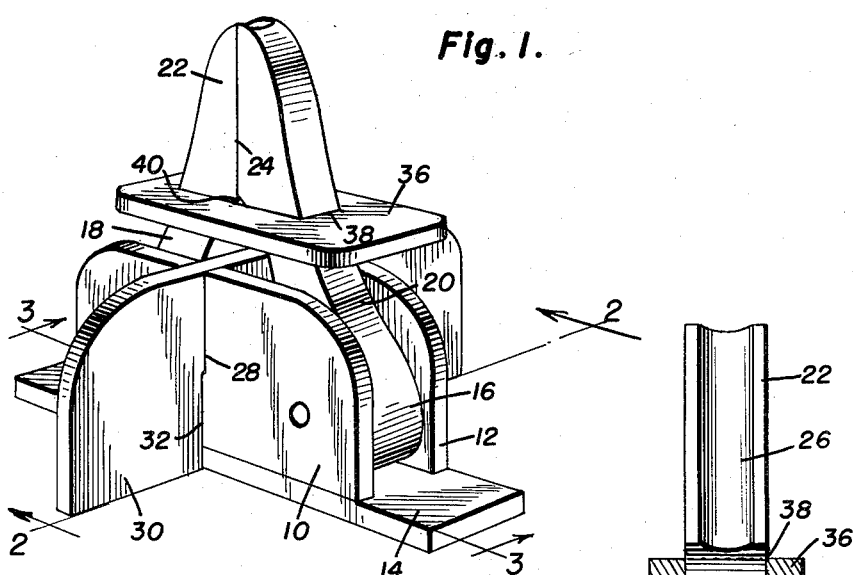
Fig. 1.
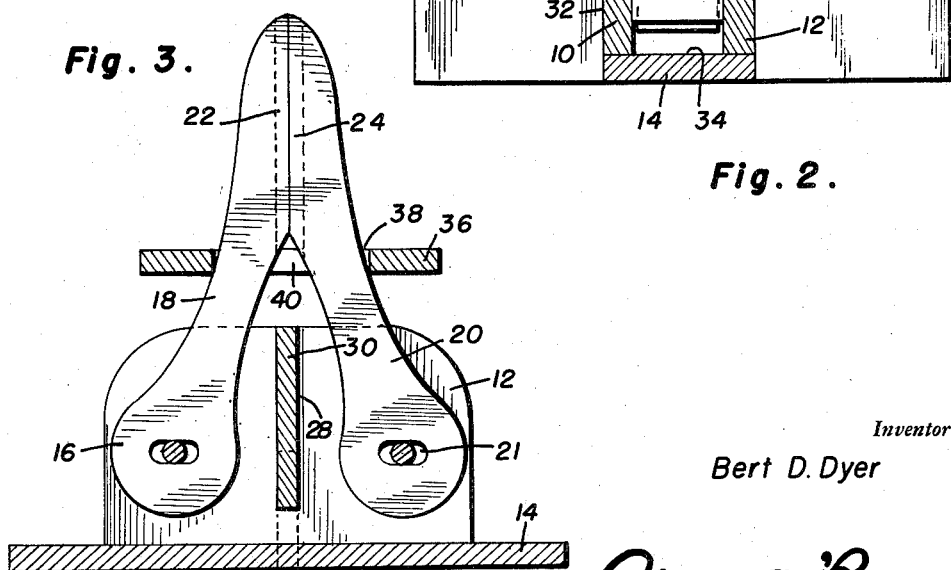
Fig. 3.
Fig. 2.
Inventor
Bert D. Dyer
By *Clarence A. O'Brien and Harvey B. Jacobson*
Attorneys Patented Nov. 21, 1950

2,531,117

UNITED STATES PATENT OFFICE 2,531,117

TREE HOLDER

Bert D. Dyer, Seattle, Wash.

Application May 5, 1947, Serial No. 746,093

4 Claims. (Cl. 248—44)

This invention relates to new and useful improvements in tree holders and the primary object of the present invention is to provide a device of the character referred to which can hold a tree at a selected angle with the surface on which the device is supported.

Another important object of the present invention is to provide a Christmas tree holder including parts thereof that are readily and quickly disassembled, facilitating transporting and shipping of the device.

A further object of the present invention is to provide a tree holder including novel and improved means for clamping the opposed article holding means of the device to each other.

A still further aim of the present invention is to provide a device of the class described that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention showing the jaws clamped to each other;

Figure 2 is a vertical transverse sectional view taken substantially on line 2—2 of Figure 1, and Figure 3 is a vertical longitudinal sectional view taken on line 3—3 of Figure 1.

Referring now to the drawings in detail, wherein for the purpose of illustration, there is disclosed a preferred embodiment of the present invention, the numerals 10 and 12 represent a pair of spaced side walls that are suitably secured to the longer upper side edges of a substantially rectangular base 14. Pivoted between the side walls intermediate the ends thereof, are the rounded enlarged ends 16 of a pair of arms 18 and 20 having longitudinal slots 21 permitting slight movement of the arms toward and away from each other. The free portions of these arms 18 and 20 terminate in opposed gripping jaws 22 and 24. Each of these jaws are provided with concaved recessed portions 26, Figure 2, which fit the periphery of a tree or the like (not shown) which is to be gripped therebetween.

Opposed vertical slots 28 are provided in side walls 10 and 12, preferably centrally located between the ends of the side walls, and engage and retain a member 30 having vertical complemental slots 32. A notched portion 34 extends between the slots 32 to permit the member 30 to bear on the base 14, with the lower edge of member 30 co-planar with the lower edge of base 14.

A substantially rectangular plate 36 is provided with a rectangular opening 38 through which th jaws extend, and the opposite side edges of the openings are provided with arcuate notches 40 permitting the plate to bear against the periphery of the tree placed between the jaws.

In practical use of the device, the plate 36 is raised to permit a tree or the like to be inserted between jaws 22 and 24 to rest upon the upper edge of plate 30 and between concaved recessed portions 26. By pressing downwardly on the plate 36 the inner edges of the plate opening 38 bear against the jaws to force the jaws together, and the notches 40 in the plate prevent the tree gripped between the jaws from slipping from the plate or from the recessed portion in the jaws.

Member 30 is at right angles to the base to prevent the base from tipping over and thus further supporting the side walls 10 and 12 in a vertical position. It is obvious from the drawings that member 30 is quickly and readily removed from the side walls, allowing the device to be packed in a small area container for storage or shipment thereof.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. An improved tree holder comprising a base, a pair of side walls carried by said base, removable wall carried by said side walls at right angles to said side walls, the lower edge of said removable wall being co-planar with said base, a pair of opposed jaws pivoted between said side walls, and means for clamping said jaws against an article placed therebetween.

2. An improved tree holder comprising a base, a pair of side walls carried by said base, a removable wall carried by said side walls at right angles to said side walls, the lower edge of said removable wall being co-planar with said base, a pair of opposed jaws pivoted between said side walls, and a plate including an aperture for receiving said jaws for clamping said jaws against an article placed therebetween.

3. A tree holder comprising a base including a pair of side members, a pair of gripping members pivotally and slidably carried by said side members, and means slidably engaging said gripping members for clamping the gripping members against an article and for retaining the gripping members disposed at a selected angle with said base.

4. A tree holder comprising a base including a pair of side members, a pair of gripping members having enlarged end portions, the enlarged end portions of said gripping members being provided with slots, pivot pins carried by the side members slidably engaging the slots in the end portions of said gripping members, said gripping members having arcuate edges, and a holding plate having an opening for receiving said gripping members, said plate having a pair of bearing edges adjacent said opening for slidably engaging the arcuate edges of said gripping members.

BERT D. DYER.

REFERENCES CITED

The following references are of record in the file of this patent:

UNITED STATES PATENTS

| Number | Name | Date |
|---|---|---|
| 328,007 | Coffin | Oct. 13, 1885 |
| 345,925 | Schoenthaler | July 20, 1886 |
| 772,905 | Polly | Oct. 18, 1904 |
| 1,546,314 | Prince | July 14, 1925 |
| 1,794,107 | Doyle et al. | Feb. 24, 1931 |
| 1,876,276 | Danner | Sept. 6, 1932 |
| 2,023,340 | Peskulich | Dec. 3, 1935 |
| 2,390,292 | Burton | Dec. 4, 1945 |

FOREIGN PATENTS

| Number | Country | Date |
|---|---|---|
| 631,248 | Germany | June 19, 1936 |